United States Patent
Ch'ng et al.

(10) Patent No.: US 8,229,498 B2
(45) Date of Patent: Jul. 24, 2012

(54) ASSIGNING CODE SPACE TO PORTABLE BASE STATIONS

(75) Inventors: Shi Baw Ch'ng, North Billerica, MA (US); Amit Mate, Chelmsford, MA (US); Satish Ananthaiyer, Tewksbury, MA (US); Vedat Eyuboglu, Concord, MA (US)

(73) Assignee: Airvana, Corp., Chelmsford, MA (US)

( * ) Notice: Subject to any disclaimer, the term of this patent is extended or adjusted under 35 U.S.C. 154(b) by 698 days.

(21) Appl. No.: 11/617,298

(22) Filed: Dec. 28, 2006

(65) Prior Publication Data

US 2008/0159236 A1 Jul. 3, 2008

(51) Int. Cl.
*H04M 1/00* (2006.01)
(52) U.S. Cl. ......................... 455/551; 455/561
(58) Field of Classification Search ................ 370/335
See application file for complete search history.

(56) References Cited

U.S. PATENT DOCUMENTS

| | | | |
|---|---|---|---|
| 5,623,495 A * | 4/1997 | Eng et al. ................. 370/397 |
| 6,163,524 A | 12/2000 | Magnusson et al. |
| 6,208,873 B1 | 3/2001 | Black et al. |
| 6,233,231 B1 | 5/2001 | Felix et al. |
| 6,272,122 B1 * | 8/2001 | Wee ................. 370/342 |
| 6,301,484 B1 | 10/2001 | Rogers et al. |
| 6,317,452 B1 | 11/2001 | Durrant et al. |
| 6,400,755 B1 | 6/2002 | Harris et al. |
| 6,560,194 B1 | 5/2003 | Gourgue et al. |
| 6,597,677 B1 * | 7/2003 | Segawa .................. 370/342 |
| 6,615,038 B1 | 9/2003 | Moles et al. |
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 6,804,216 B1 * | 10/2004 | Kuwahara et al. .......... 370/335 |
| 6,876,690 B1 | 4/2005 | Imbeni et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 8,078,165 B2 | 12/2011 | Mate et al. |
| 2002/0051437 A1 * | 5/2002 | Take ....................... 370/335 |
| 2002/0101943 A1 * | 8/2002 | Proctor, Jr. ................ 375/346 |
| 2002/0167907 A1 | 11/2002 | Sarkar et al. |
| 2002/0196749 A1 | 12/2002 | Eyuboglu et al. |

(Continued)

FOREIGN PATENT DOCUMENTS

CN 101536587 A 9/2009

(Continued)

OTHER PUBLICATIONS

Harry Newton, Newton's Telecom Dictionary, Mar. 2007, Flatrion Publishing, 23rd, p. 1006.*

(Continued)

*Primary Examiner* — Yuwen Pan
*Assistant Examiner* — Ayodeji Ayotunde
(74) *Attorney, Agent, or Firm* — Fish & Richardson P.C.

(57) ABSTRACT

In addition to other aspects disclosed, a portable base station requests assignment of a portion of a code space from a remotely located control station. The assignment is based upon the location of the portable base station. The portable base station is also capable of transmitting an identification signal using the assigned code space portion to uniquely identify the portable base station to one or more access terminals.

31 Claims, 5 Drawing Sheets

U.S. PATENT DOCUMENTS

| | | | |
|---|---|---|---|
| 2003/0026225 A1* | 2/2003 | Ogino et al. | 370/335 |
| 2003/0065805 A1 | 4/2003 | Barnes, Jr. | |
| 2003/0100311 A1 | 5/2003 | Chung et al. | |
| 2003/0114180 A1 | 6/2003 | Black et al. | |
| 2004/0076120 A1 | 4/2004 | Ishidoshiro | |
| 2004/0081134 A1* | 4/2004 | Kotzin | 370/348 |
| 2004/0081144 A1 | 4/2004 | Martin et al. | |
| 2004/0177270 A1 | 9/2004 | Little et al. | |
| 2004/0258027 A1* | 12/2004 | Tsybakov et al. | 370/335 |
| 2005/0026640 A1 | 2/2005 | Pan | |
| 2005/0099974 A1* | 5/2005 | Kats et al. | 370/328 |
| 2005/0136949 A1 | 6/2005 | Barnes, Jr. | |
| 2005/0213555 A1 | 9/2005 | Eyuboglu et al. | |
| 2005/0232242 A1 | 10/2005 | Karaoguz et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0179322 A1 | 8/2006 | Bennett et al. | |
| 2006/0203746 A1* | 9/2006 | Maggenti et al. | 370/254 |
| 2006/0209721 A1 | 9/2006 | Mese et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0010261 A1 | 1/2007 | Dravida et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140163 A1 | 6/2007 | Meier et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0213049 A1 | 9/2007 | Bishop | |
| 2007/0220573 A1 | 9/2007 | Chiussi et al. | |
| 2007/0230392 A1 | 10/2007 | Adams et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2007/0265013 A1 | 11/2007 | Labedz | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |

FOREIGN PATENT DOCUMENTS

| | | | |
|---|---|---|---|
| EP | 907263 A2 * | 4/1999 | |
| EP | 2 046 084 A1 | 4/2009 | |
| GB | 2456090 | 7/2009 | |
| GB | 2456694 A8 | 7/2009 | |
| WO | WO 9849844 A2 * | 11/1998 | |
| WO | WO2007/008574 | 1/2007 | |
| WO | WO2008/030933 | 3/2008 | |
| WO | WO2008/030934 | 3/2008 | |
| WO | WO2008/030956 | 3/2008 | |
| WO | WO2008/082985 | 7/2008 | |

OTHER PUBLICATIONS

U.S. Appl. No. 60/824,877, filed Sep. 7, 2006, including application as filed and (PTO website).

U.S. Appl. No. 11/640,415, filed Dec. 15, 2006, including application as filed, (PTO website), and pending claims.

PCT application No. PCT/US2007/77725 filed on Sep. 6, 2007, with Publication No. WO2008/030934, including application as filed, (PTO website).

International Search Report and Written Opinion from PCT application No. PCT/US2007/77725, Patent Cooperation Treaty, mailed Mar. 20, 2008, 14 pages.

U.S. Appl. No. 11/640,501, filed Dec. 15, 2006, including application as filed, (PTO website), and pending claims.

PCT application No. PCT/US2007/77722 filed on Sep. 6, 2007, with Publication No. WO2008/030933, including application as filed, (PTO website).

International Search Report and Written Opinion from PCT application No. PCT/US2007/77722, mailed on May 5, 2008, 44 pages.

U.S. Appl. No. 11/640,503, filed Dec. 15, 2006, including application as filed, (PTO website), and pending claims.

PCT application No. PCT/US2007/077755 filed on Sep. 6, 2007, with Publication No. WO2008/030956, including application as filed, (PTO website).

International Search Report and Written Opinion mailed Dec. 19, 2008 from PCT application No. PCT/US2007/77755 (12 pages).

PCT application No. PCT/US2007/088112 filed on Dec. 19, 2007, with Publication No. WO2008/082985, published on Jul. 10, 2008, including application as filed, (PTO website).

Kramer et al., "Building and Measuring a High Performance Network Architecture," Apr. 20, 2001, pp. 31, LBNL Technical Report No. LBNL 47274:WTCK.

3rd Generation Partnership Project "3GPP2", "cdma2000 High Rate Packet Data Air Interface Specification", TIA/EIA/IS-856, C.S0024, version 4.0, Oct. 25, 2002 (548 pages).

3rd Generation Partnership Project "3GPP2", "cdma2000 High Rate Data Air Interface Specification", TIA/EIA/IS-856, C.S0024-A, version 2.0, Jul. 2005 (1227 pages).

3rd Generation Partnership Project "3GPP2", "cdma2000 High Rate Data Air Interface Specification", TIA/EIA/IS-856, C.S0024-B, version 1.0, Apr. 2006 (1623 pages).

Office action from U.S. Appl. No. 11/640,503 mailed Oct. 10, 2008.

International Search Report and Written Opinion from corresponding PCT application No. PCT/US2007/088112 mailed on Jun. 3, 2008 (13 pages).

Office action from U.S. Appl. No. 11/640,415 mailed May 14, 2009.

Office action and response history of U.S. Appl. No. 11/640,415 to Oct. 9, 2009.

Office action and response history of U.S. Appl. No. 11/640,503 to Oct. 9, 2009.

Examination Report for GB Application No. 0905846.2 mailed Sep. 10, 2009 (2 pages).

International Preliminary Report on Patentability from PCT application No. PCT/US2007/077725 mailed Mar. 19, 2009 (11 pages).

International Preliminary Report on Patentability from PCT application No. PCT/US2007/077722 mailed Mar. 19, 2009 (11 pages).

International Preliminary Report on Patentability from PCT application No. PCT/US2007/077755 mailed Mar. 19, 2009 (8 pages).

Office action from U.S. Appl. No. 11/640,503 mailed May 7, 2009.

International Preliminary Report on Patentability from PCT application No. PCT/US2007/088112 mailed Jul. 9, 2009 (7 pages).

Office action and response history of U.S. Appl. No. 11/640,503 to Jan. 6, 2010.

Response filed in GB Application No. 0905846.2 filed on Jan. 8, 2010.

Office action and response history of U.S. Appl. No. 11/640,415 to Apr. 12, 2010.

Office action and response history of U.S. Appl. No. 11/640,503 to Apr. 12, 2010.

Office action and response history of U.S. Appl. No. 11/640,501 to Apr. 27, 2010.
Office action and response history of U.S. Appl. No. 11/640,501 to Jan. 20, 2010.
Office action and response history of U.S. Appl. No. 11/640,415 to Apr. 29, 2010.
Office action and response history of U.S. Appl. No. 11/640,503 to Apr. 30, 2010.
Office action and response history of U.S. Appl. No. 11/640,501 to Oct. 22, 2009.
Office action and response history of U.S. Appl. No. 11/640,415 to Dec. 17, 2009.
Fish & Richardson P.C., Response to Non Final Office action mailed Oct. 7, 2010 in U.S. Appl. No. 11/640,501, filed Jan. 7, 2011, 21 pages.
Examination Report issued Jul. 26, 2010 from United Kingdom patent application No. GB0905844.7, 2 pages.
Notice of allowance of GB Application No. 0905846.2 mailed on Feb. 16, 2010.
Fish & Richardson P.C., Response to Final Office action mailed Apr. 27, 2010 in U.S. Appl. No. 11/640,501, filed Jul. 27, 2010, 21 pages.
U.S. Randy Peaches, USPTO Non Final Office Action in U.S. Appl. No. 11/640,415, dated Oct. 5, 2010, 34 pages.
U.S. Randy Peaches, USPTO Non Final Office Action in U.S. Appl. No. 11/640,501, dated Oct. 7, 2010, 52 pages.
Fish & Richardson P.C., Response to Non Final Office action mailed Oct. 5, 2010 in U.S. Appl. No. 11/640,415, filed Feb. 7, 2011, 23 pages.
USPTO Non Final Office Action in U.S. Appl. No. 11/640,501, dated Mar. 30, 2011, 51 pages.
USPTO Final Office Action in U.S. Appl. No. 11/640,415, dated Apr. 19, 2011, 38 pages.
USPTO Notice of Allowance in U.S. Appl. No. 11/640,503, dated Aug. 8, 2011, 8 pages.
USPTO Examiner's Amendment in U.S. Appl. No. 11/640,503, dated Aug. 8, 2011, 1 page.
Fish & Richardson P.C., Response to Final Office action mailed Mar. 30, 2011 in U.S. Appl. No. 11/640,501, filed Sep. 30, 2011, 22 pages.
Fish & Richardson P.C., Response to Final Office action mailed Apr. 19, 2011 in U.S. Appl. No. 11/640,415, filed Oct. 19, 2011, 23 pages.

* cited by examiner

ASSIGNING CODE SPACE TO PORTABLE BASE STATIONS

BACKGROUND

This description relates to assigning portions of a code space to portable base stations.

Cellular communication systems include antenna towers erected in fixed locations to provide wireless coverage to devices such as cellular phones, personal digital assistants (PDAs) and computer systems (each of which is referred to as an Access Terminal or AT). In some situations an AT may be located within the coverage area of multiple towers. To distinguish one tower from another, each tower transmits a unique identification signal that includes information assigned to the tower. This information may be a sequence of pseudorandom numbers (PN) that are transmitted in a repetitive manner. To uniquely identify each tower, transmission of the PN sequence is initiated from different elements in the sequence or different sequences may be transmitted. Using one PN sequence, the starting elements may be identified by a number that represents the offset from the first element in the sequence to the starting element (assigned to the tower). Prior to becoming operational, different offsets may be assigned to the towers in a procedure known as radio frequency (RF) planning that seeks to protect against interfering identification signals being transmitted from two or more closely located towers.

SUMMARY

In general, in some aspects of the invention, a portable base station requests assignment of a portion of a code space from a remotely located control station. The assignment is based upon the location of the portable base station. The portable base station also transmits an identification signal using the assigned code space portion to uniquely identify the portable base station to one or more access terminals.

The request from the portable base station may include data that represents the location of the portable base station. The code space may include a sequence of pseudorandom numbers and the assigned code space portion may be defined by an offset associated with the sequence. This offset may be represented by one or more types of data such as by a number of chips. Requesting the assignment may be initiated by a predefined event such as powering up the portable base station or the remotely located control station requesting the status of the portable base station. The code space may conform to one or more standards and protocols such as a Code Division Multiple Access (CDMA) standard, a Universal Mobile Telecommunication System (UMTS) standard, or other similar standard.

In some aspects of the invention, a system is disclosed that includes a portable base station that requests assignment of a portion of a code space from a remotely located control station. The assignment is based upon the location of the portable base station. The portable base station is also capable of transmitting an identification signal by using the assigned code space portion to uniquely identify the portable base station to one or more access terminals.

The portable base station may provide the functionality of a radio node, a radio node controller, an access gateway, and other similar components. The assignment may be based upon the distance between the portable base station and another base station. The remotely located control station may include a server for assigning the code space portions. The assignment request may include data that represents the location of the portable base station. The code space may include a sequence of pseudorandom numbers and the assigned code space portion may be defined by an offset associated with the sequence. This offset may be represented by one or more types of data such as by a number of chips. Requesting the assignment may be initiated by a predefined event such as powering up the portable base station or the remotely located control station requesting the status of the portable base station. The code space may conform to one or more standards and protocols such as a Code Division Multiple Access (CDMA) standard, a Universal Mobile Telecommunication System (UMTS) standard, or other similar standard.

In some aspects of the invention, a medium bears instructions to cause a portable base station to request assignment of a portion of a code space from a remotely located control station. The assignment is based upon the location of the portable base station. The instructions also cause the portable base station to transmit an identification signal using the assigned code space portion such that the identification signal uniquely identifies the portable base station to one or more access terminals.

The request from the portable base station may include data that represents the location of the portable base station. The code space may include a sequence of pseudorandom numbers and the assigned code space portion may be defined by an offset associated with the sequence. This offset may be represented by one or more types of data such as by a number of chips. Requesting the assignment may be initiated by a predefined event such as powering up the portable base station or the remotely located control station requesting the status of the portable base station. The code space may conform to one or more standards and protocols such as a Code Division Multiple Access (CDMA) standard, a Universal Mobile Telecommunication System (UMTS) standard, or other similar standard.

Among the advantages of the techniques described here are one or more of the following.

By dynamically assigning code space (e.g., offsets of a pseudorandom number sequence, etc.) to portable base stations, the portable stations may be deployed and made operational in a relatively short time period and in a cost effective manner (compared to the time-consuming, deliberate and often expensive exercise of manual code space assignment). Additionally, by requesting the assignments from a control station, code space assignments may be tracked by the control station along with the location of the portable base stations. Furthermore, predefined events may initiate assignment requests, thereby, providing more controllability in allocating the code space.

Other features and advantages will be apparent from the description and the claims.

DESCRIPTION

Figure 1:
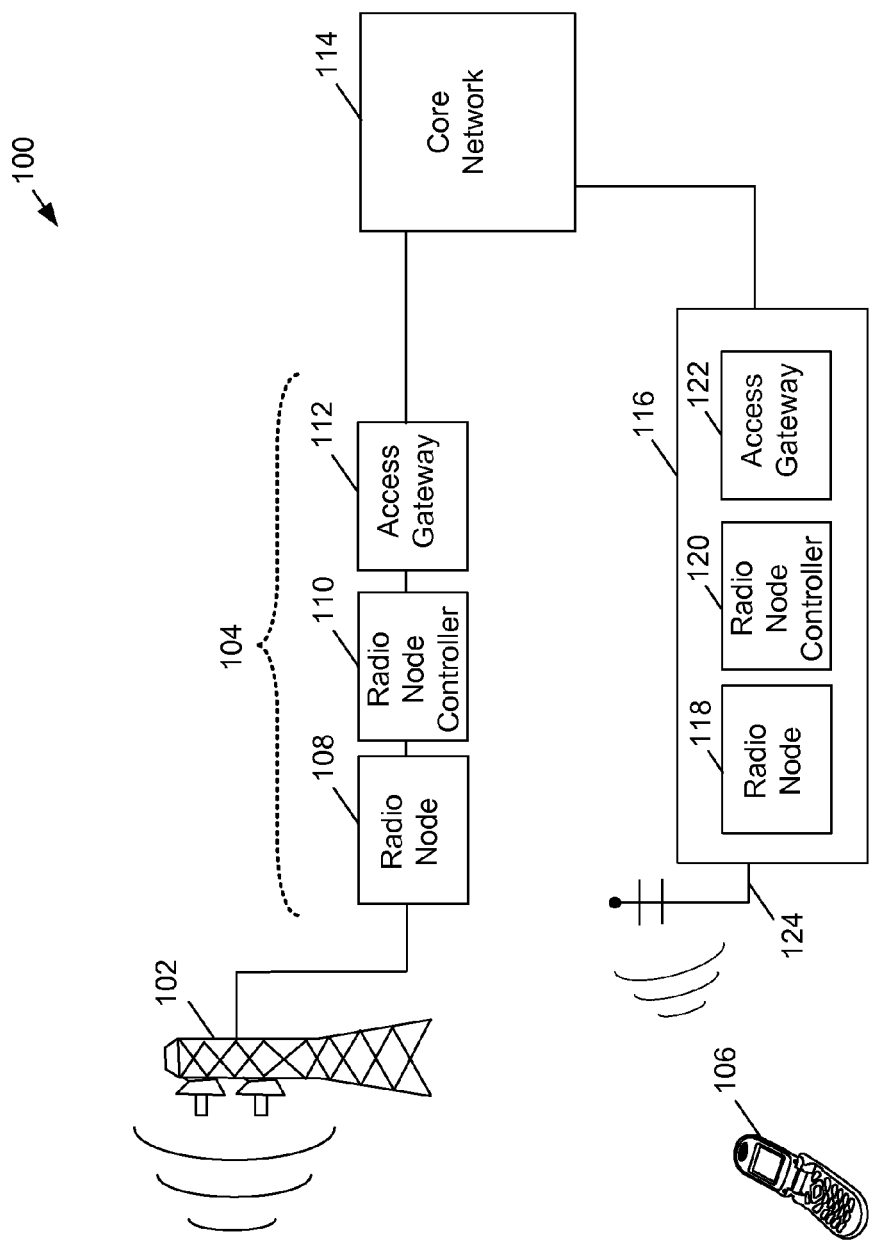
FIG. 1 is a diagram of a telecommunication core network in communication with a fixed location base station and a portable base station.

Referring to FIG. 1, a radio access network (RAN) 100 includes a conventional antenna tower 102 that is erected at a fixed location and transmits and receives electromagnetic signals that are provided to or from a fixed location base station 104. One or more signaling techniques and standards may be implemented by the fixed location base station 104 to establish communication links (via the antenna tower 102) with one or more ATs such as a cellular telephone 106. For example, techniques and standards associated with the Universal Mobile Telecommunications System (UMTS) may be implemented such that multiple ATs may establish communication links and access the fixed location base station 104. Standards associated with spread spectrum air interface protocols such as code division multiple access (CDMA), wideband (W-CDMA), etc. may also be implemented for multiple AT access.

Other protocols supported may include the 1×EV-DO protocol, which is an EVolution of the 1×RTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference. Revision B to this specification has been initiated as TIA/EIA/IS-856, "CDMA2000 High Rate Packet Data Air Interface Specification," 3GPP2 C.S0024-B, Version 1.0, March 2006 and is also incorporated herein by reference.

To identify itself, the fixed location base station 104 transmits a signal (via the antenna 102) that uses one or more spread spectrum techniques such as being modulated with a unique pseudorandom code. Thereby, the identification signal may appear as noise, however, the signal may be extracted with a correlation process by an appropriate receiver aware of the pseudorandom sequence. By implementing such spread spectrum techniques or orthogonal coding techniques, an AT may distinguish base station identities and the probability of identification signal interference may be reduced. Other types of orthogonal or non-orthogonal coding techniques may also be used to produce unique transmission signals. For example, different PN sequences (e.g., gold sequences) referred to as scrambling codes (for W-CDMA) may be implemented. Different types of information may also be transmitted to uniquely identify the base station 104. For example data (e.g., a cell identifier) uniquely assigned to the base station 104 may be transmitted.

To provide an identification signal (along with transmitting and receiving other signals), the fixed location base station 104 includes a radio node (RN) 108 that supports the wireless standards and protocols (e.g., CDMA, W-CDMA, UMTS, etc.) for communicating with the ATs. Typically the RN 108 includes a transceiver for receiving and transmitting electromagnetic signals. The RN 108 may also include one or more components (e.g., a modulator/demodulator (MODEM)) for modulating a transmission carrier signal to encode digital information for transmission or demodulating a received analog signal to decode transmitted digital information. The RN 108 is connected to a radio node controller (RNC) 110 that provides commands (and transmission signals) to the RN 108 and receives incoming signals from the RN 108. An access gateway 112 such as a packet data serving node (PDSN) is connected to the RNC 110 and may be implemented as a data server to direct data packets to appropriate delivery locations. Additionally the access gateway 112 provides an interface between networking functions and service levels defined by one or more standards such as the Open Systems Interconnect (OSI) protocol standard defined by the International Standards Organization (ISO), which is herein incorporated by reference. With reference to the seven OSI protocol layers, the access gateway 112 provides an interface between the link layer (e.g., layer 2) functionality provided by the fixed location base station 104 and the routing layer (e.g., layer 3) functionality provided by a core network 114 that is connected to the fixed location base station. Along with sending and receiving content (e.g., data packets) to and from the fixed location base station 104, the core network 114 exchanges data and signals with other components included in the RAN 100. For example, data may be sent to other base stations, conventional landline telephone systems (e.g., Plain Old Telephone Service (POTS) systems, etc.) or other similar delivery sites and sources.

As mentioned above, antenna towers such as antenna tower 102 are erected to remain fixed at one location. Prior to erecting the towers, the geographical layout of the towers is planned to provide wireless coverage. Additionally each tower is assigned a portion of a code space so that the antenna (and corresponding fixed location base station 104) may uniquely identify itself to the one or more ATs within the coverage area. Since ATs such as AT 106 communicate with base stations (e.g., CDMA, W-CDMA and UMTS base stations) on the equivalent frequencies, an AT needs to differentiate one fixed location base station from another. In order to identify each fixed location base station separately, each base station repeatedly transmits an identical pseudorandom number (PN) sequence of codes that are offset in time from the PN sequences being transmitted by the other base stations. The PN offset is assigned to each fixed location base station respectively connected to an antenna erected at a fixed location. Typically these offset assignments are determined prior to the antenna tower becoming operational and are static in the sense of not being adjusted once the tower is in operation. However, such a manual offset assignment process is often time-consuming and expensive. Different PN-sequences may also be transmitted to uniquely identify base stations. Furthermore, signals may be transmitted on different frequencies or share a similar frequency.

The RAN 100 also includes a portable base station 116 that is in communication with the core network 114 and provides the functionality of the fixed location base station 104. For example, the portable base station 116 includes an RN 118, an RNC 120 and an access gateway 122 (e.g., a PSDN). The portable base station 116 is connected to a portable antenna 124 that is capable of establishing links with one or more ATs, however, antenna characteristics (e.g., beam pattern, gain, etc.) of the portable antenna are typically selected for establishing links to ATs located relatively close to the portable base station. Furthermore, the design characteristics (e.g., component size, power consumption, etc.) of the RN 118, RNC 120 and the access gateway 122 may be selected for portability. As such, the portable base station 116 may provide less wireless coverage area than the fixed location base station 104 (e.g., coverage to service a single residential home, a portion of a multiple residence building or other structure or location of similar size and area). However, due to its mobility, the portable base station 116 may interfere with the operations of the fixed base station 104 or other relatively closely located base stations (e.g., other portable base stations, fixed location base stations). For example, identification signals using near-by or equivalent code space (e.g., PN offset, PN sequence, etc.) may interfere with the identification signals transmitted by the portable base station 116.

Figure 2:
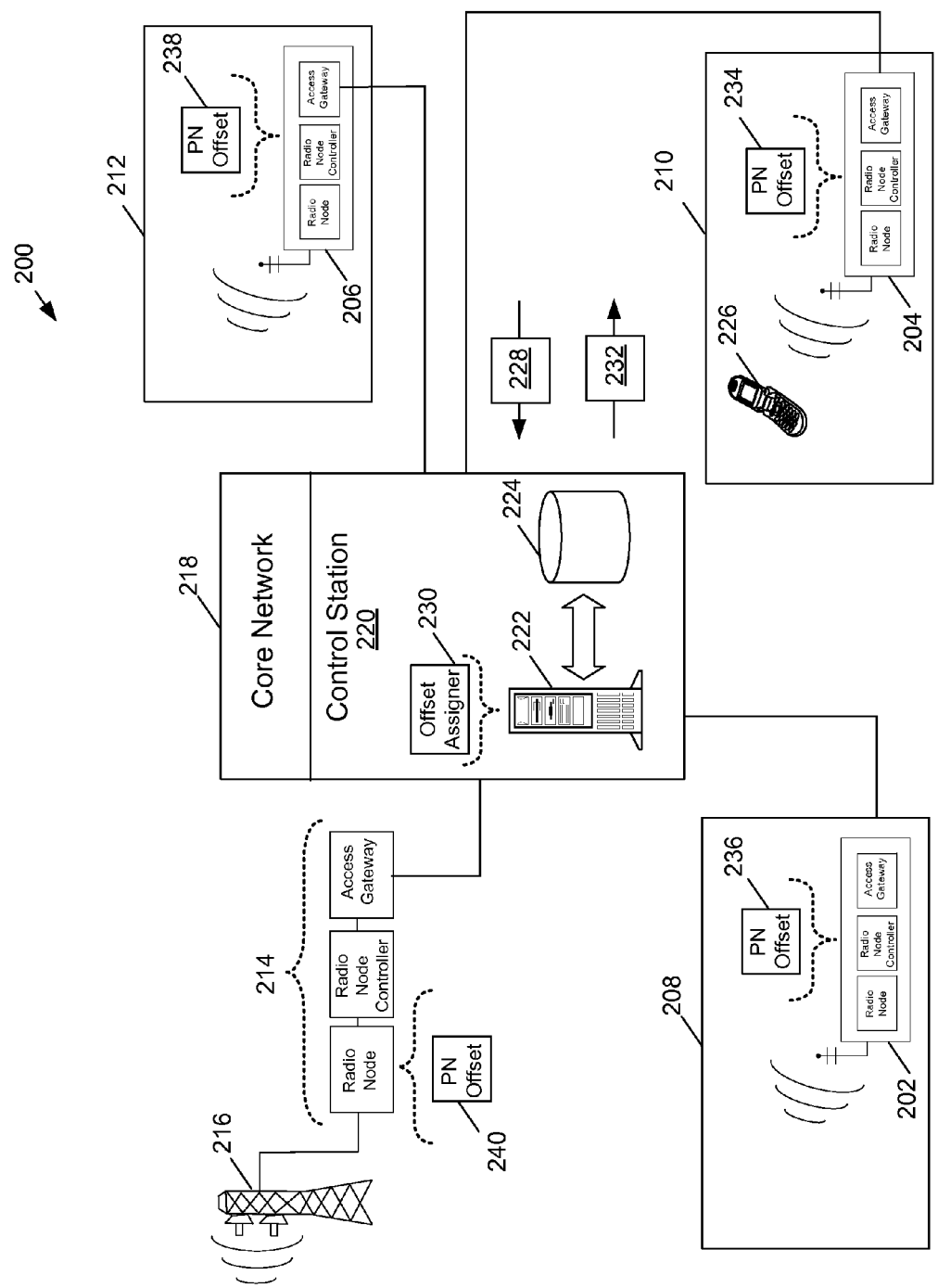
FIG. 2 is a diagram of a control station in communication with multiple portable base stations and a fixed location base station.

Referring to FIG. 2, a RAN 200 includes three portable base stations 202, 204, 206 that are respectively located at and provide coverage to three separate locations (e.g., residential homes) 208, 210, 212. The RAN 200 also includes a fixed base station 214 that is connected to an antenna tower 216 that also provides wireless coverage (e.g., larger coverage than the portable base stations). Each of the portable base stations 202, 204, 206 and the fixed base station 214 are connected to a core network 218 that is in communication with a control station 220 (e.g., remotely located from the locations 208, 210 and 212) that includes a server 222 or other type of computing device (e.g., a computing system) or multiple computing devices that may provide distributed processing. The server 222 is in communication with a storage device 224 (e.g., magnetic, magneto-optical disks, or optical disks, etc.) that stores files, data structures, applications and instructions for execution by the server, or other types of data.

Due to their mobility, two or more of the portable base stations 202, 204, 206 may be closely located to each other (or to the fixed tower 216) and transmit identification signals on different or equivalent frequencies. As such, an AT 226 may be unable to distinguish between the pair of portable base stations (or a portable base station and the fixed tower 216). For example, locations 210 and 212 may be closely located (e.g., adjacent rooms, apartments, etc.) and the AT 226 may detect identification signals from both of the portable base stations 204 and 206. In particular, if the PN offsets or PN sequences (used by the portable base stations 210 and 212) are similar (e.g., occupy nearby code space or equivalent code space), the AT 226 may be unable to distinguish between the identification signals. In another scenario, additional portable base stations (using similar code space) may be moved into the area (e.g., placed in adjacent rooms or the same room) and may not be distinguishable by the AT 226.

By assigning PN offsets (or different PN sequences) dynamically to each portable base station, code space may be allocated in a cost effective and timely manner (as each station is deployed). Furthermore, dynamic allocation allows distinguishable identification signals to be transmitted (using different or equivalent frequencies) from closely located portable base stations, thereby reducing potential signal collisions. For example, PN offsets widely separated in a PN sequence may be assigned to closely located portable base stations (or the fixed tower base station and a portable base station). As the portable base stations are moved (e.g., from one residence to another), the PN offset assignments may be adjusted to reduce potential identification signal collision. For example, by tracking the locations (e.g., Global Positioning System (GPS) coordinates) of the portable base stations and the fixed location base stations, a code space may be segmented and assigned for minimal interference among the base stations.

In the exemplary RAN 200, the control station 220 (via communication with the core network 218) dynamically allocates code space (e.g., one or more PN sequences) and assigns portions of the code space (e.g., PN offsets, PN sequences, etc.) to each of the portable base stations 202, 204, 206 (and optionally, the fixed location base station 214). Location tracking, PN offset assignment storage, and other functions may also be provided by the control station 220. In this arrangement, the server 222 executes operations for tracking the location of the base stations (e.g., portable base stations, fixed location base stations) and assigns appropriate PN offsets to the base stations based upon the location information and potentially other information (e.g., base station capabilities, performance, time of day, etc.). The server 222 stores the code space assignments along with other information (e.g., base station location information, base station capabilities, assignment confirmations, etc.) in the storage device 224. In some implementations transmissions between the control station 220 and the base stations (fixed or portable) are encrypted to reduce the probability of interception or modification. Furthermore, the encryption technique(s) may block base station users from modifying information (e.g., PN offsets) included in the transmissions.

PN offset (or PN sequence) assignment(s) may be initiated by the occurrence of a particular event which may or may not be predefined. For example, a portable base station may request a PN offset upon becoming operational (e.g., powered up) and establishing communication with the core network 218. The request may be provided in one or more forms such as a signal, electronic message, file, data structure, or other similar form. For illustration, a message 228 is sent by the portable base station 204 to the control station 220 via the core network 218 upon being powered up and establishing a communication link with the core network. In a similar manner the other portable base stations 202, 206 may request a PN offset (or other type of code space portion) upon becoming operational. In addition to becoming operational, events that initiate a PN offset request may include the occurrence of predefined time (e.g., midnight each evening), resetting the portable base station, user initiated, or other type of event.

The request 228 may contain one or more types of information such as data that identifies the portable base station 204 (e.g., a unique alphanumerical identifier assigned to the base station by a manufacturer, etc.), the location of the portable base station (e.g., GPS coordinates), base stations capabilities (e.g., coverage area, transmission power, etc.), status information (e.g., number of established ATs links) and other types of information. For example, GPS coordinates may be inserted into the message 228 from a GPS receiver (not shown) that is included in the portable base station 204. Location information may also be provided from an external source such as an external GPS receiver or other type of location determining device in communication with the portable base station 204. Data that represents a previously used PN offset (or other type of code space portion) may also be included in the message 228. For example, the last PN offset assigned or a list of previously assigned PN offsets (e.g., all assignments, assignments over a period of time) may be provided in the request. These previously assigned PN offsets may be used by the server 222 for assigning the requested offset (e.g., assign a new PN offset, assign a previously used PN offset, etc.). In some arrangements, preference may factor into some assignments as described in "Configuring Preferred User Zone Lists for Private Access Points for Wireless Networking", U.S. patent application Ser. No. 11/640,503, filed on Dec. 15, 2006, the entire contents of which are hereby incorporated by reference. Information such as location information may be provided to the portable base station 204 from a user interface (e.g., a keyboard) or a data conduit (e.g., communication port) from another device (e.g., a GPS receiver). Other included information may be used for security (e.g., a public key, etc.), data compression, or other types of functions.

Rather than the portable base station 204 initiating a request, the control station 220 may trigger a request for a PN offset assignment. For example, a polling signal may be sent from the control station 220 to each of the base stations (portable and fixed location) at predefined intervals (e.g., daily, weekly, etc.). Upon receiving the polling signal, requests such as the request 228 may be produced and sent from the corresponding portable base station 204 to the control station 220. Along with polling all of the portable and fixed location base stations, in some arrangements a portion of the base stations may be polled. For example, based stations located in a particular geographical region may be polled at one time and base stations located in another region may be polled at a different time. In another scenario, the server 222 may track mobile base stations that are more frequently assigned PN offsets (e.g., due to frequent movements). These base stations may be polled more frequently than base stations that have a relatively stationary history.

To process the received requests, an Offset Assigner 230 is executed by the server 222. Along with request processing, the Offset Assigner 230 identifies the appropriate PN offset (if any) that should be assigned and informs the base station of the assignment. For example, upon determining a PN offset assignment for the portable base station 204, a message 232 is sent from the control station 220 to the portable base station. Data 234 represents the PN offset that may be retrieved from the message 232 and stored in a memory (not shown) (e.g., random access memory (RAM), read-only memory (ROM), static RAM (SRAM), etc.) or a storage device (also not shown) included in the portable base station 204. Similarly, the control station 220 may respectively provide PN offsets 236, 238 to the other portable base stations 202, 206. While the fixed location base station 214 is typically assigned a PN offset based upon a planning procedure that is executed prior to the tower 216 becoming operational, in some scenarios the control station 220 may assign a PN offset 240 to the fixed location base station. The assigned PN offset 240 may be used by a MODEM, which is included in the RN portion of the fixed location base station 214, to produce an appropriate identification signal.

As PN offsets are assigned, the server 222 stores data that represents the offset assignments. For example, data may be stored in the storage unit 224 that uniquely represents both the assigned offset and the base station to which it is assigned. One or more data types, data structures, storage techniques and methodologies may be implemented so that the assigned offsets may be efficiently stored and retrievable.

One or more techniques and methodologies may be used by the Offset Assigner 230 to determine PN offset assignments. For example, by using location information included from the request messages, the Offset Assigner 230 may use the distance between the base stations in determining the PN offset assignments. The capabilities of the base stations may also be used in the determination. For example, the range that each base station is capable of establishing an AT link may be used to determine potential signal collision ranges among the base stations. These and other techniques and methodologies, known in the art of signal collision avoidance, individually or in combination, may be implemented by the Offset Assigner 230.

Figure 3:
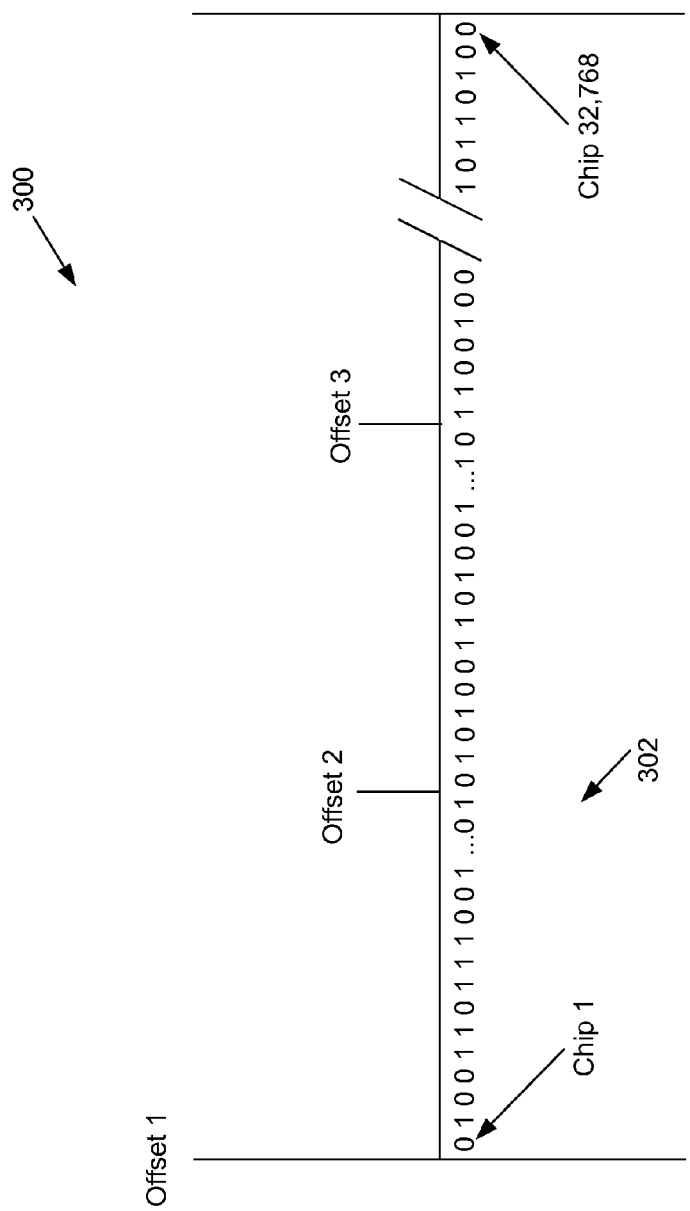
FIG. 3 is a diagram of a PN sequence.

Referring to FIG. 3, a diagram 300 represents a sequence 302 of pseudorandom numbers that form one exemplary code space that may be allocated among portable base stations (and fixed location base stations). In this representation the PN sequence 302 includes binary numbers (e.g., a "0" or a "1") that occur substantially at random in the sequence. The PN sequence 302 may be generated by implementing one or more techniques, for example, a random number generator may produce the sequence. Each binary number is referred to as a chip and may be considered the basic building element from which the PN sequence is produced. The length of the PN sequence is referred to as a frame and is predefined with a relatively large number of chips. For example, this sequence may represent 32,768 chips, however, other exemplary sequences may include more or less chips.

As mentioned, for identification, each portable base station may transmit the sequence as an identification signal within its coverage distance. To provide a continuous signal, the sequence is transmitted in a repetitive manner from each base station. Each portable base station transmits a unique identification signal to differentiate itself from other base stations. For example, each portable base station may initiate transmission of the sequence 302 starting from a different chip included in the sequence. Each starting chip may be identified by dividing the frame into a predefined number of segments. For example, the frame may be divided into segments with equivalent chip lengths (e.g., sixty-four chips). As such, the frame (with a length of 32,768 chips) is divided into 512 segments that each include 64 chips. Alternatively, segments lengths may not be equivalent and some may contain different number of chips.

In the figure, the first chip of each segment is identified as an offset. For example, "Offset 1" identifies the first chip of the first sixty-four chip segment, "Offset 2" identifies the first chip of the next sixty-four chip segment and "Offset 3" identifies the first chip of the next following segment. In this example, the final sixty-four chip segment starts with a chip identified by offset 512 (not shown). While a sixty-four chip segment is used in this illustration, segment length may be longer or shorter.

Factors such as the number of portable (and fixed location) base stations may influence frame segmentation. For example, for a large amount of base stations, the frame may be segmented to provide many offset values. Alternatively, for fewer base stations, the frame may be segmented to provide fewer offsets (with wider separations). Furthermore, frame segmentation may be time dependent. For example, for certain time periods (e.g., during the day, week, etc.) the frame may be segmented to provide a particular number of offsets for base station assignments. Then, at another time period, the frame may be re-segmented to provide more or less offsets. In other scenarios, segmenting may be initiated by the occurrence of an event. For example, the number of portable base stations located at a particular location (e.g., a sporting event stadium) may increase based on a predefined event (e.g., a sporting event). The frame may be divided to provide additional offsets during the event and upon the completion of the event, the frame may be re-segmented to provide less offsets since less portable bases stations may be present at the location.

Various types of information such as RAN level factors (e.g., the number of base stations, base station separation distances, etc.), base station specific information (e.g., transmission and reception capabilities), performance metrics (e.g., collision probability) and other information may also influence offset assignment. For example, two portable base stations (e.g., base station 204 and 206) that are separated by a relatively small distance may be respectively assigned offsets (e.g., offset 1 and offset 256) separated a considerable distance in the frame. Generally, the probability of collision reduces as offset separation increases. Also, design, performance and calibration metrics may be relaxed with increased offset separation. For example, for widely separated PN offsets, timing calibration may be relaxed. So, rather than frequently monitoring a highly accurate timing signal (e.g., a timing signal from a GPS system) to calibrate one or more internal clocks, a base station may use a less accurate timing reference signal, e.g., from a core network (or other timing source). Furthermore, timing calibration cycles may occur less frequent for base stations using widely separated offsets. Due to this calibration relaxation, less accurate and less expensive components may be used to produce the base stations. Similarly, reducing the number of frame segmentations (e.g., from 512 to 256), increases offset separation and thereby reduces the probability of signal collision.

Characteristics of the PN sequence may be selected to agree with one or more standards and protocols. For example, the frame length and frame segmentation may be selected to conform with a standard. A CDMA frame has a predefined length of 32,768 chips while a UMTS frame has a length of 40,960 chips. Both CDMA and UMTS frames may be divided into segments (referred to as slots) that are designated for particular channels. For example, a CDMA time slot may be defined to include 2048 chips while a UMTS time slot length includes 2560 chips. As such a CDMA frame has 16 slots while a UMTS frame has 15 slots. However, the frame length and slot length may vary dependent upon the standards and protocols being implemented.

Starting with the chip identified by the offset (e.g., Offset 2) assigned to the portable base station (e.g., portable base station 204), the following chips are sequentially used to produce an identification signal. Upon reaching the end of the sequence (e.g., chip 32768), the portable base station returns to the beginning of the sequence (e.g., chip 1) and repetitively uses the sequence. While this particular example uses a sequence of pseudorandom numbers to define the code space and offsets to define segments of the code space, other methodologies and techniques may be implemented to define and segment a code space.

Figure 4:
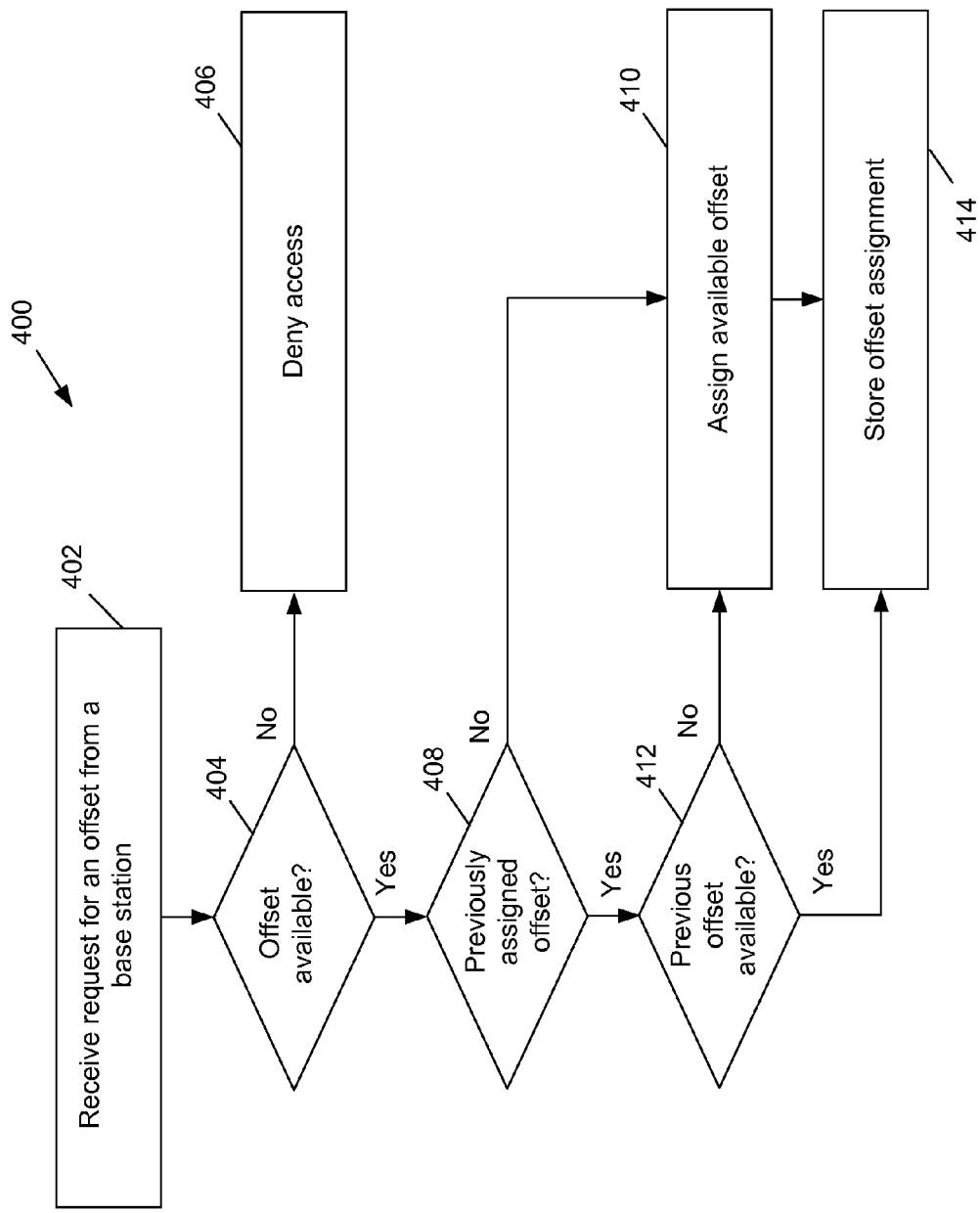
FIG. 4 is a flow chart of operations executed by an Offset Assigner.

Referring to FIG. 4, a flowchart 400 represents some of the operations of the Offset Assigner 230 (shown in FIG. 2). As mentioned above, the Offset Assigner 230 may be executed at the control station 220. For example, the server 222, a computer system of other type of computation device located at the control station 220 may execute the Offset Assigner 230. Furthermore, along with being executed at a single site (e.g., control station 220), operation execution may be distributed among two or more sites. For example, some operations may be executed by one or more of the portable base stations and at the server located at the control station 220.

Operations of the Offset Assigner 230 include receiving 402 a request for an offset assignment from a base station such as a portable base station (e.g., base station 204) and determining 404 if an offset may be assigned to the base station. For example, the Offset Assigner 230 may access a list of available offsets that is stored in server memory (not shown), the storage device 224 or other type of data storage unit that is in communication with the server 222. Previously assigned offsets to the portable base station may also be checked for availability. If no offsets are available, operations of the Offset Assigner 230 may include denying 406 the portable base station access to the RAN. The Offset Assigner 230 may also send a signal or message to inform the portable base station of the lack of offset availability and possibly provide an estimated time in which availability may improve.

If one or more offsets are available, operations include determining 408 if an offset had been previously assigned to the portable base station. For example, the request from the portable base station may include data that represents that one or more offsets had been previously assigned and the Offset Assigner 230 may check data stored in the server, the storage device, or other device to identify any previously assigned offsets. The server may also request additional information from the portable base station to identify the offsets. For example, the server may send a message to the portable base station that includes a request for any previous offsets assigned to the base station.

If an offset had not been previously assigned, operations include assigning 410 an available offset to the portable base station. As mentioned above, the offset assignment may use one or more factors. For example, the approximate location of the portable base station along with the location of other base stations (portable and fixed location) near by (or remotely located) to the portable base station may be used to determine the assigned offset. Operational characteristics of one or more base stations (portable and fixed location) may also be used. For example transmission power, coverage area (e.g., number of coverage sectors), antenna beam patterns, etc. may be used to identify an appropriate offset for assignment.

In this implementation, if an offset had been previously assigned to the portable base station, operations include determining 412 if the previous assignment may be reused. For example, the Offset Assigner 230 may check presently assigned offsets to determine if the previous assignment is currently being used by another base station. If the previously assigned offset is unavailable, operations include assigning 410 an available offset to the portable base station. If the previous assignment is available, the Offset Assigner 230 may re-assign the offset to the base station. Whether re-assigned or newly assigned, operations also include storing 414 the offset assignment for later retrieval and use. Typically, data that identifies the offset assignment and the portable base station are stored in memory, storage device 222, or other type of storage unit. Data structures and files along with data storage techniques and methodologies may be implemented to store the information.

Figure 5:
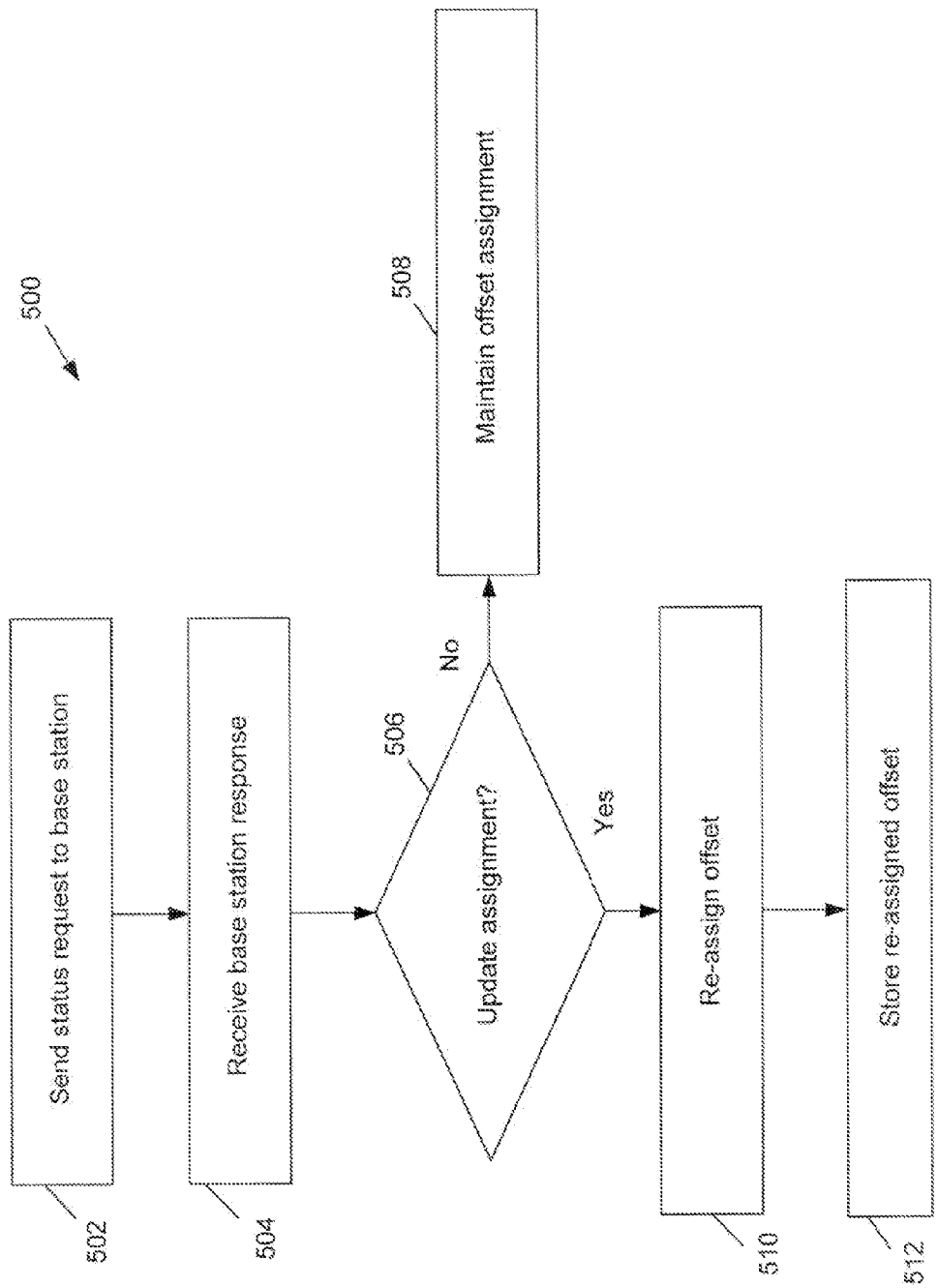
FIG. 5 is a flow chart of other operations executed by an Offset Assigner.

Referring to FIG. 5, a flow chart 500 represents operations in which the Offset Assigner 230 monitors the offset assignments and dynamically adjusts the assignments, as needed. As the portable base stations are moved (e.g., enter areas, leave areas, etc.) from location to location, the probability of collisions may increase if two or more closely located bases stations can not be distinguished by one or more ATs in the general vicinity. By monitoring the status (e.g., location, operability, etc.) of the portable base stations in communication with the server 222, the Offset Assigner 230 may update offset assignments in an efficient (and cost effective) manner, and thereby to reduce the probability of collisions. For example, as a portable base station is moved near (e.g., into the same building) to a group of other portable base stations, offsets may be adjusted to reduce conflicting assignments. In some implementations, the portable base stations may periodically send messages to the control station 220 that include status information (e.g., location, operability, etc.), or, the control station 220 may solicit status information from portable base stations. For example, the server 220 may send or broadcast a message to each portable base station. As such, operations of the Offset Assigner 230 may include sending 502 a status request to each portable base station (and optionally, to each fixed location base station). In response to receiving the status request, the portable base stations may send a message to the control station 220 that includes status information. In some scenarios, one or more responses may be delayed due to current activities or non-activity of the base station. For example, if currently providing service to an AT, a base station may not be able to send a response until service operations are complete or sufficient base station processing resources become available. Base stations that are not operating (e.g., powered down) typically are unable to send a response to answer the control station 220 request. In some arrangements, delayed responses and lack of responses are tracked by the control station 220 and may factor into the offset assignments.

Operations also include receiving 504 one or more base station responses and determining 506 if the offset assignment(s) should be updated. Along with changes in location, changes in operability and the introduction of one or more new portable base stations, the Offset Assigner 230 determines if one or more offset assignments should be updated. For example, assignments may be deleted, added, or changed based upon the received responses.

If determined that the current assignments are satisfactory (e.g., due to minimal changes in deployment locations, meeting a predefined collision probability threshold, satisfying a metric, etc.), the Offset Assigner 230 may maintain 508 the offset assignment(s). In some implementations operations may also include recording this determination for statistical or other analysis. If assignment updates are warranted, operations include re-assigning 510 the offsets as appropriate. For example, portable base stations may be assigned offsets based upon moving to different locations, to reduce the probability of collision (e.g., separate the offset distances), etc., or, new offset assignments may be identified and sent to the corresponding base stations. The Offset Assigner 230 also stores 512 the offset re-assignments, for example, in the storage device 224 for later retrieval and use.

The Offset Assigner 230 may also monitor other operations and events associated with the base stations. For example, PN offsets, PN sequences or other types of code space portions used in base station transmissions may be monitored. By monitoring the transmissions, the Offset Assigner 230 may compare the code space portions (used in transmissions) to the assigned portions of code space. If a match is detected, the transmissions may be allowed to continue. If a match is not detected, one or more signals or commands may be sent from the control station 220 to halt transmission from the respective base station. Accordingly, the properly assigned code space portion may then be provided to the base station for use in identification transmissions.

In some embodiments one or more processors may execute instructions to perform the operations of the Offset Assigner 220, e.g., respectively represented in flowchart 400 and 500. For example, one or more general processors (e.g., a microprocessor) and/or one or more specialized devices (e.g., an application specific integrated circuit (ASIC), etc.) may execute instructions. One or more of the processors may be implemented in a single integrated circuit as a monolithic structure or in a distributed structure. In some embodiments the instructions that are executed by the processors may reside in a memory (e.g., random access memory (RAM), read-only memory (ROM), static RAM (SRAM), etc.). The instructions may also be stored on one or more mass storage devices (e.g., magnetic, magneto-optical disks, or optical disks, etc.).

One or more of the operations associated with the Offset Assigner 220 may be performed by one or more programmable processors (e.g., a microprocessor, an ASIC, etc.) executing a computer program. The execution of one or more computer programs may include operating on input data (e.g., data provided from a source external to the RAN, etc.) and generating output (e.g., sending data to a destination external to the RAN, etc.). The operations may also be performed by a processor implemented as special purpose logic circuitry (e.g., an FPGA (field programmable gate array), an ASIC (application-specific integrated circuit), etc.).

Operation execution may also be executed by digital electronic circuitry, or in computer hardware, firmware, software, or in combinations of them. The operations described in flowcharts 400 and 500 (along with other operations of the Offset Assigner 220) may be implemented as a computer program product, e.g., a computer program tangibly embodied in an information carrier, e.g., in a machine-readable storage device (e.g., RAM, ROM, hard-drive, CD-ROM, etc.). The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

Other embodiments are within the scope of the following claims.

What is claimed is:

1. A method comprising:
   a portable base station, requesting dynamic assignment of a portion of a code space by sending a message to a remotely located control station, the message includes information about the portable base station and is absent information about other base stations, wherein the code space has previously been partially allocated to other base stations, and the assignment is based, at least in part, upon the location of the portable base station and allocation of the previously allocated code space portions to the other base stations remain unchanged; and
   transmitting an identification signal from the portable base station, using the assigned code space portion as assigned by the remotely located control station, to uniquely identify the portable base station to one or more access terminals, wherein the remotely located control station is different from the one or more access terminals.

2. The method of claim 1 in which the request from the portable base station includes data that represents the location of the portable base station.

3. The method of claim 1 in which the code space includes a sequence of pseudorandom numbers.

4. The method of claim 3 in which the assigned code space portion is defined by an offset associated with the sequence of pseudorandom numbers.

5. The method of claim 4 in which the offset is defined by a number of chips.

6. The method of claim 1 in which requesting the assignment is initiated by a predefined event.

7. The method of claim 6 in which the event includes powering up the portable base station.

8. The method of claim 6 in which the event includes the remotely located control station requesting the status of the portable base station.

9. The method of claim 1 in which the code space conforms to a Code Division Multiple Access (CDMA) standard.

10. The method of claim 1 in which the code space conforms to a Universal Mobile Telecommunication System (UMTS) standard.

11. A system comprising:
    a portable base station to request dynamic assignment of a portion of a code space by sending a message to a remotely located control station, the message includes information about the portable base station and is absent information about other base stations, wherein the code space has previously been partially allocated to other base stations, and the assignment is based, at least in part, upon the location of the portable base station and allocation of the previously allocated code space portions to the other base stations remain unchanged, the portable base station is also capable of transmitting an identification signal by using the assigned code space portion as assigned by the remotely located control station to uniquely identify the portable base station to one or more access terminals, wherein the remotely located control station is different from the one or more access terminals.

12. The system of claim 11 in which the portable base station provides the functionality of a radio node, a radio node controller and an access gateway.

13. The system of claim 11 in which the assignment is based upon the distance between the portable base station and another base station.

14. The system of claim 11 in which the remotely located control station includes a server to assign the code space portion.

15. The system of claim 11 in which the assignment request includes data that represents the location of the portable base station.

16. The system of claim 11 in which the code space includes a sequence of pseudorandom numbers.

17. The system of claim 16 in which the assigned code space portion is defined by an offset associated with the sequence of pseudorandom numbers.

18. The system of claim 17 in which the offset is defined by a number of chips.

19. The system of claim 11 in which the assignment is requested upon the occurrence of a predefined event.

20. The system of claim 19 in which the event includes powering up the portable base station.

21. The system of claim 19 in which the event includes the remotely located control station requesting the status of the portable base station.

22. The system of claim 11 in which the code space conforms to a Code Division Multiple Access (CDMA) standard.

23. The system of claim 11 in which the code space conforms to a Universal Mobile Telecommunication System (UMTS) standard.

24. A tangible medium bearing instructions to cause:
a portable base station to request dynamic assignment of a portion of a code space by sending a message to a remotely located control station, the message includes information about the portable base station and is absent information about other base stations, wherein the code space has previously been partially allocated to other base stations, and the assignment is based, at least in part, upon the location of the portable base station and allocation of the previously allocated code space portions to the other base stations remain unchanged; and
transmission of an identification signal from the portable base station by using the assigned code space portion as assigned by the remotely located control station, wherein the identification signal uniquely identifies the portable base station to one or more access terminals, wherein the remotely located control station is different from the one or more access terminals.

25. The tangible medium of claim 24 in which the assignment request from the portable base station includes data that represents the location of the portable base station.

26. The tangible medium of claim 24 in which the assigned code space includes a sequence of pseudorandom numbers.

27. The tangible medium of claim 26 in which the assigned code space portion is defined by an offset associated with the sequence of pseudorandom numbers.

28. The tangible medium of claim 27 wherein the offset is defined by a number of chips.

29. The tangible medium of claim 24 wherein requesting the assignment is initiated by an event.

30. The tangible medium of claim 29 wherein the event includes powering up the portable base station.

31. The tangible medium of claim 29 wherein the event includes the remotely located control station requesting the status of the portable base station.

* * * * *